United States Patent
Kim et al.

(10) Patent No.: US 12,479,505 B2
(45) Date of Patent: Nov. 25, 2025

(54) METHOD AND APPARATUS FOR PROVIDING GUIDELINES FOR PARKING AND STOPPING OF VEHICLE

(71) Applicant: HYUNDAI MOBIS CO., LTD., Seoul (KR)

(72) Inventors: Jong Soo Kim, Seongnam-si (KR); Guk Seong Woo, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 84 days.

(21) Appl. No.: 18/423,568

(22) Filed: Jan. 26, 2024

(65) Prior Publication Data
US 2024/0286677 A1 Aug. 29, 2024

(30) Foreign Application Priority Data
Feb. 27, 2023 (KR) .................. 10-2023-0025596

(51) Int. Cl.
*B62D 15/02* (2006.01)
*B60R 1/27* (2022.01)

(52) U.S. Cl.
CPC .............. *B62D 15/028* (2013.01); *B60R 1/27* (2022.01); *B62D 15/0245* (2013.01); *B60R 2300/305* (2013.01); *B60R 2300/806* (2013.01)

(58) Field of Classification Search
CPC ...... B60Q 1/0023; B60Q 1/484; B60Q 9/005; B60Q 9/007; B60Q 7/00; B60Q 9/00; B60Q 9/002; B60Q 9/004; B60K 35/00; B60K 35/10; B60K 35/22; B60K 35/265; B60K 35/28; B60K 35/81; B60K 2360/11; B60K 2360/179; B60K 2360/21; B60K 35/20; B60K 35/285; B60K 2360/173; B60R 1/28; B60R 2300/102; B60R 2300/103; B60R 2300/105; B60R 2300/106; B60R 2300/207; B60R 2300/301; B60R 2300/302; B60R 2300/303; B60R 2300/305; B60R 2300/306; B60R 2300/607; B60R 2300/70; B60R 2300/8053; B60R 2300/806; B60R 2300/8086; B60R 2300/00; B60R 2300/80; B60R 1/27; B60R 1/00; B60R 1/20;
(Continued)

(56) References Cited

U.S. PATENT DOCUMENTS 8,258,933 B2 * 9/2012 Son ................. B62D 15/0275
340/436
2004/0119610 A1 * 6/2004 Maemura ............ B60Q 9/005
348/148
(Continued)

*Primary Examiner* — Brian A Zimmerman
*Assistant Examiner* — Anthony D Afrifa-Kyei
(74) *Attorney, Agent, or Firm* — NovoTechIP International PLLC

(57) ABSTRACT

A method and apparatus for providing guidelines for parking and stopping of a four-wheel steering vehicle. The method includes: generating a surround view based on a video signal acquired from a plurality of cameras that capture the front, rear, left side, and right side of the vehicle; generating the guidelines based on a driving mode; and displaying the surround view and the guidelines on a display unit. The driving mode is classified according to a steering angle of each wheel of the vehicle, and the guidelines are displayed to extend from an image of the vehicle.

8 Claims, 12 Drawing Sheets

(58) Field of Classification Search
CPC ......... B60R 1/22; B60R 1/23; B62D 15/0275; B62D 15/028; B62D 15/0295; G01C 21/005; G01C 21/3602; B60T 2201/10; B60T 2210/32; B60W 2050/146; B60W 30/06; B60W 50/14; H04N 7/183
See application file for complete search history.

(56) References Cited

U.S. PATENT DOCUMENTS

| | | | |
|---|---|---|---|
| 2010/0070139 A1* | 3/2010 | Ohshima | B62D 15/028 |
| | | | 701/42 |
| 2012/0257055 A1* | 10/2012 | Kim | G09G 5/02 |
| | | | 348/148 |
| 2016/0314752 A1* | 10/2016 | Nakano | B60K 35/28 |
| 2020/0312054 A1* | 10/2020 | Morimoto | G07C 5/06 |
| 2024/0278773 A1* | 8/2024 | Holler | B60K 17/358 |

* cited by examiner

Forward gear signal(D)

Reverse gear signal(R)

Forward gear signal(D)

Reverse gear signal(R)

Forward gear signal(D)

Forward gear signal(D)

Forward gear signal(D)

Reverse gear signal(R)

METHOD AND APPARATUS FOR PROVIDING GUIDELINES FOR PARKING AND STOPPING OF VEHICLE

CROSS-REFERENCE TO RELATED APPLICATIONS

The present application claims priority to Patent Application No. 10-2023-0025596, filed on Feb. 27, 2023 in Korea, the entire contents of which are incorporated herein by reference.

TECHNICAL FIELD

The present disclosure relates to a method and apparatus for providing guidelines for parking and stopping of a vehicle. More specifically, the present disclosure relates to a method and apparatus for providing guidelines for parking and stopping of a four-wheel steering vehicle.

BACKGROUND

The description in this section merely provides background information related to the present disclosure and does not necessarily constitute the related art.

A four-wheel steering vehicle refers to a vehicle that steers the front and rear wheels of the vehicle together. Since each wheel may be independently controlled in the four-wheel steering vehicle, each wheel may have various steering angles. Accordingly, the four-wheel steering vehicle may perform behavior that are difficult for a two-wheel steering vehicle to perform.

A four-wheel steering vehicle is capable of in-phase steering and reverse phase steering. In-phase steering is steering in which the steering direction of the front and rear wheels is the same. Reverse phase steering is steering in which the steering direction of the front and rear wheels is different.

In-phase steering may be utilized when changing lanes of a vehicle or adjusting the position of the vehicle in a narrow space. Reverse phase steering may be utilized when a vehicle performs turn behavior, such as a U-turn, left turn, and right turn. Specifically, when making a right turn, the front wheels of a four-wheel steering vehicle are oriented in a right direction, and the rear wheels are oriented in a left direction, which is an opposite direction to the front wheels. Unlike a two-wheel steering vehicle, a four-wheel steering vehicle has a low probability that a rear tail of the vehicle collides with a surrounding object when turning in a narrow space because the steering angle of the rear wheels is changed.

A surround view monitoring system is a system that captures the surroundings of a vehicle and displays a surround view on a display. The surround view monitoring system indicates an expected moving path of a vehicle by overlaying a guideline, which is a virtual image, on a surround view displayed on the display.

The surround view monitoring system captures the back of a vehicle or the side of the vehicle, which is out of line of sight of a driver, and displays the same on a display. In addition, since a guideline is displayed corresponding to a change in the steering angle of the vehicle, the driver may smoothly park or stop in a narrow alley or narrow parking space.

A four-wheel steering vehicle is capable of more diverse steering and behavior than a two-wheel steering vehicle. For example, the four-wheel steering vehicle is capable of vertical driving, in-situ rotation, diagonal driving, and reverse phase driving.

In vertical driving, the steering angle of all wheels of a vehicle is 90 degrees, and the vehicle travels in a straight line perpendicular to the longitudinal direction of the vehicle. In-situ rotation, a vehicle rotates in situ without moving back and forth and left and right. In diagonal driving, the steering angles of all wheels all have the same value. Reverse phase driving refers to driving in which the steering directions of the front and rear wheels are opposite.

As described above, since each wheel of a four-wheel steering vehicle may be independently steered, a guideline for the surround view monitoring system also requires various patterns to correspond to the behavior of the four-wheel steering vehicle. Since the conventional surround view monitoring system supports only behavior that a two-wheel steering vehicle may perform, there is an issue in that there may not be provided with a surround view and guidelines corresponding to steering and driving patterns of a four-wheel steering vehicle.

SUMMARY

The present disclosure is directed to addressing an issue associated with the related art, and to providing a method and apparatus for providing guidelines for providing a surround view and guideline corresponding to the behavior of a four-wheel steering vehicle.

According to an embodiment, a method for providing guidelines for parking and stopping of a four-wheel steering vehicle, the method comprising: generating a surround view based on a video signal acquired from a plurality of cameras that capture the front, rear, left, and right of the vehicle; generating the guidelines based on a driving mode; and displaying the surround view and the guidelines on a display unit, wherein: the driving mode is classified according to a steering angle of a wheel of the vehicle; and the guidelines are displayed to extend from an image of the vehicle.

According to an embodiment, an apparatus for providing guidelines for parking and stopping of a four-wheel steering vehicle, the apparatus comprising: a detection unit for detecting a steering angle of each wheel of the vehicle; an imaging unit for capturing the front, rear, left, and right of the vehicle; a control unit for generating a surround view by combining front, rear, left, and right images of the vehicle and controls the guidelines; and a display unit for displaying the surround view and the guidelines, wherein the control unit comprises: a surround view generation unit for generating the surround view based on a video signal input from the imaging unit; a driving direction calculation unit for calculates a steering rotation center based on the steering angle and calculating a driving direction of the vehicle based on the steering angle or the steering rotation center; and a guideline generation unit for generating the guidelines based on the steering angle or the driving direction, and wherein the guidelines are displayed to extend from an image of the vehicle.

As described above, according to the present embodiment, the method and apparatus for providing guidelines for parking and stopping of a vehicle are capable of providing a surround view and guideline corresponding to the behavior of a four-wheel steering vehicle.

In addition, when a driver of a four-wheel steering vehicle parks and stops the vehicle in a narrow alley or narrow parking space, the apparatus for providing guidelines may be used to easily and conveniently park and stop the vehicle.

DETAILED DESCRIPTION

Figure 1:
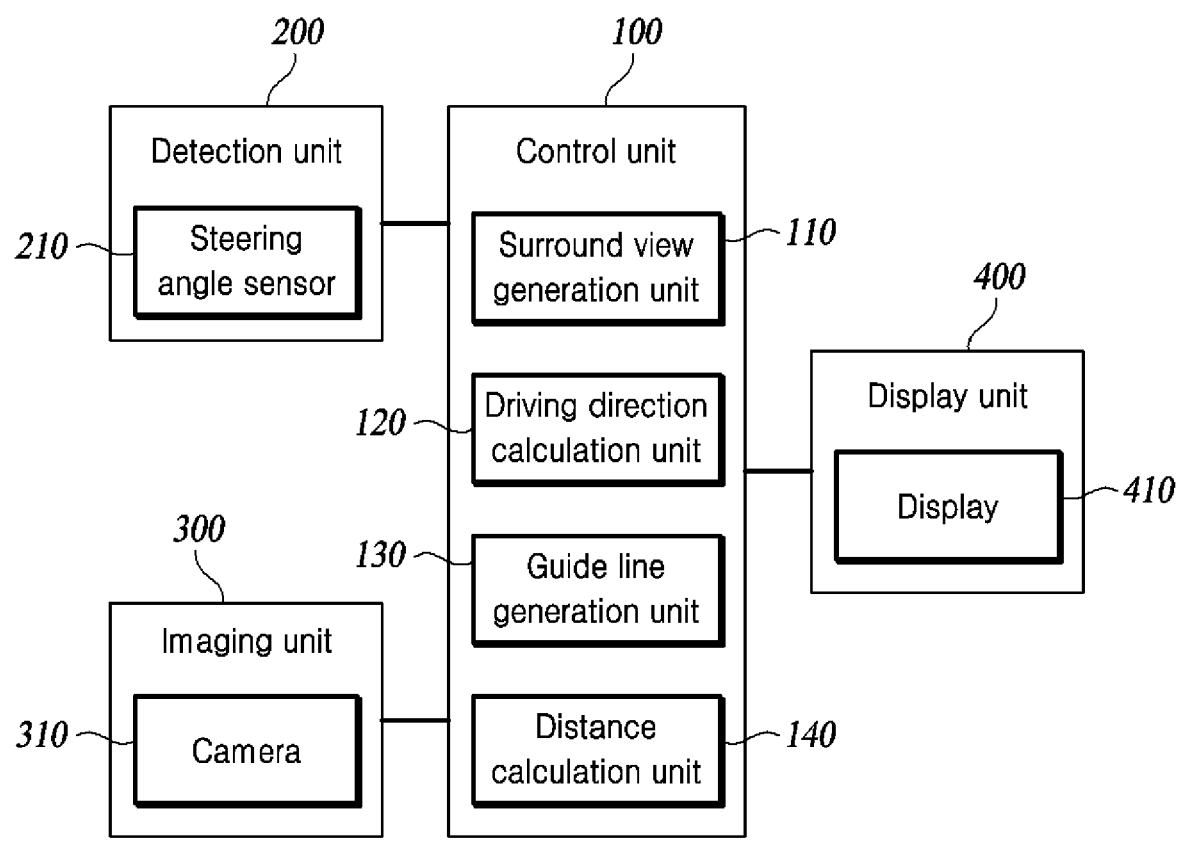
FIG. 1 is a functional block diagram illustrating an apparatus for providing guidelines according to an embodiment of the present disclosure.

Hereinafter, some exemplary embodiments of the present disclosure will be described in detail with reference to the accompanying drawings. In the following description, like reference numerals preferably designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components. Throughout this specification, when a part 'includes' or 'comprises' a component, the part is meant to further include other components, not to exclude thereof unless specifically stated to the contrary. The terms such as 'unit', 'module', and the like refer to one or more units for processing at least one function or operation, which may be implemented by hardware, software, or a combination thereof.

Each element of the apparatus or method in accordance with the present invention may be implemented in hardware or software, or a combination of hardware and software. The functions of the respective elements may be implemented in software, and a microprocessor may be implemented to execute the software functions corresponding to the respective elements.

FIG. 1 is a functional block diagram illustrating an apparatus for providing guidelines according to an embodiment of the present disclosure.

Referring to FIG. 1, an apparatus 1 for providing guidelines includes all or part of a detection unit 200, an imaging unit 300, a control unit 100, and a display unit 400.

The detection unit 200 includes all or part of a plurality of steering angle sensors 210 and vehicle speed sensors (not shown). The steering angle sensor 210 detects the steering angle of each wheel of a vehicle and transmits a detection signal to the control unit 100.

The imaging unit 300 includes a plurality of cameras 310 to generate a video signal by capturing the front, rear, left, and right of the surroundings of a vehicle. The control unit 100 receives a video signal from the imaging unit 300 and generates a surround view.

The display unit 400 includes a display 410. The display 410 receives a signal from the control unit 100 and outputs a surround view and a guideline 131.

The surround view is generated by combining front, rear, left and right videos of the vehicle captured by the imaging unit 300. Among the surround views, a top view is a point of view in which the vehicle is captured from above the vehicle. The top view is a video generated by combining video signals obtained by capturing the front, rear, left, and right of the vehicle, and is not actually captured from above the vehicle. When steering a vehicle, a driver may use the top view to clearly grasp the arrangement relationship between the vehicle he/she is steering and surrounding vehicles.

The guideline 131 is a virtual image displayed on top of the surround view. The guideline 131 is an imaginary line indicating the driving direction of a vehicle. A driver may park and stop the vehicle in a narrow alley or narrow parking space with reference to the guideline 131. The guideline 131 is displayed based on a change in the steering angle of the vehicle or a driving mode. In a four-wheel steering vehicle, the guideline 131 has various patterns.

Specifically, when the driving mode classified according to the steering angle of a wheel is a vertical driving mode, the guideline 131 may be a plurality of parallel straight lines. When the driving mode is an in-situ rotation mode, the guideline may be a circle. When the driving mode is a diagonal driving mode, the guideline 131 may be a plurality of parallel straight lines.

The control unit 100 includes all or part of a surround view generation unit 110, a driving direction calculation unit 120, a guideline generation unit 130, and a distance calculation unit 140.

The surround view generating unit 110 generates a surround view based on the video signal input from the imaging unit 300. Among the surround views, the top view is a view suitable for displaying the behavior of a vehicle of a driver and an expected riding path because the position of the vehicle of the driver and vehicles located therearound may be grasped at a glance.

The driving direction calculation unit 120 calculates the driving direction of a vehicle. Specifically, the driving direction calculation unit 120 may calculate the steering rotation center based on the steering angle of the vehicle detected by the detection unit 200. The driving direction calculation unit 120 may calculate the driving direction of the vehicle based on the steering angle or the steering rotation center. The guideline 131 may be displayed on the display 410 based on the steering angle or driving direction of the vehicle.

The distance calculation unit 140 calculates a distance D of parking space length D. For example, when parallel parking is performed using a vertical driving mode, the parking space length distance D of parking space is calculated. The parking space length D distance D of parking space refers to an interval between a vehicle parked ahead of a target parking spot and a vehicle parked behind the target parking spot. According to an embodiment, the distance calculation unit 140 may calculate the parking space length D distance D of parking space based on an input signal of the imaging unit.

According to an embodiment, the control unit 100 compares the distance D of parking space parking space length D with the whole length L thereof, which is a length of a vehicle, and determines that parking is possible when the distance D of parking space length D is greater than the whole length L thereof and determines that parking is impossible when the distance D of parking space length D is smaller than the whole length L thereof.

According to an embodiment, the distance calculation unit 140 may calculate a distance between a vehicle parked ahead of the target parking spot and a first guideline 131_1 during parallel parking, and may calculate a distance between a vehicle parked in the rear of the target parking spot and a second guideline 131_2.

The guideline generation unit 130 generates the guideline 131. The guideline 131 is a virtual image displayed on a surround view and indicates an expected driving path of a vehicle. The guideline generation unit 130 generates the guideline 131 based on the driving mode of the vehicle, the steering angle of the wheel, or the driving direction of the vehicle. The guideline 131 may be displayed to extend from an image of the vehicle.

Figure 2:
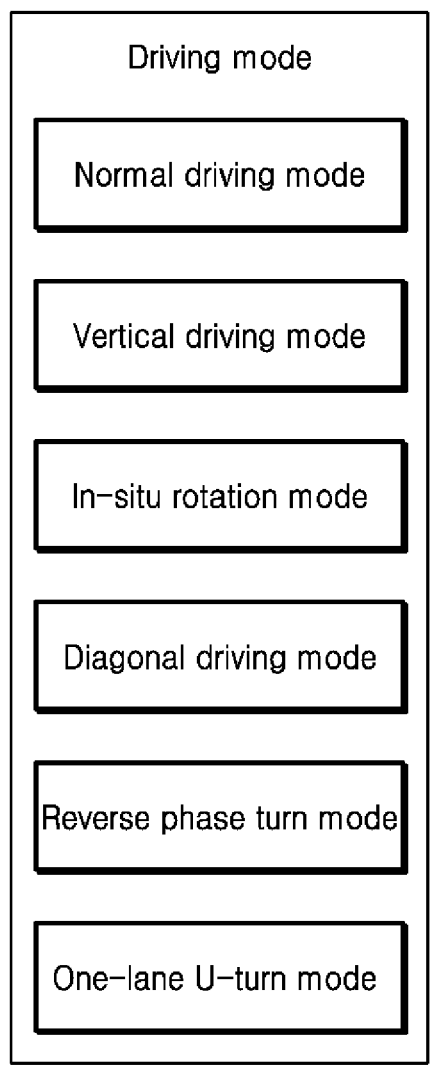
FIG. 2 shows a driving mode of a four-wheel steering vehicle according to an embodiment of the present disclosure.

FIG. 2 shows a driving mode of a four-wheel steering vehicle according to an embodiment of the present disclosure.

Figure 3:
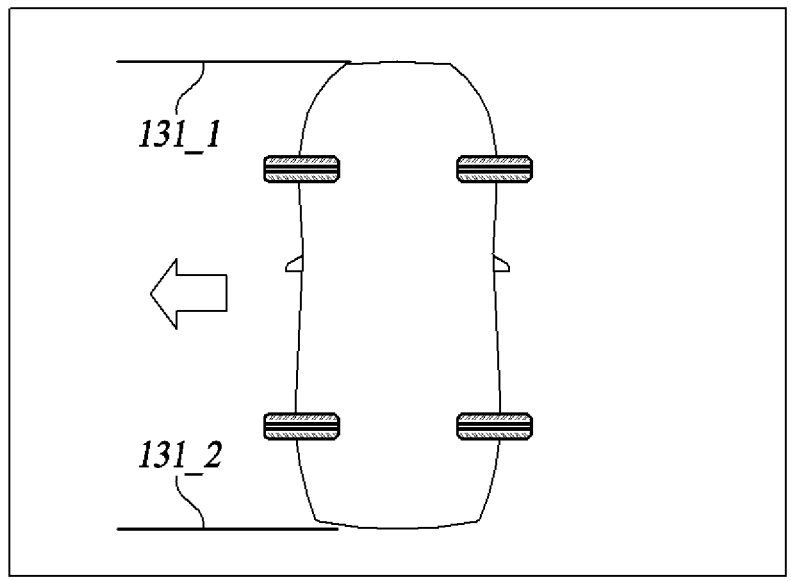
FIG. 3 is a guideline in a vertical driving mode according to an embodiment of the present disclosure.
Figure 3:
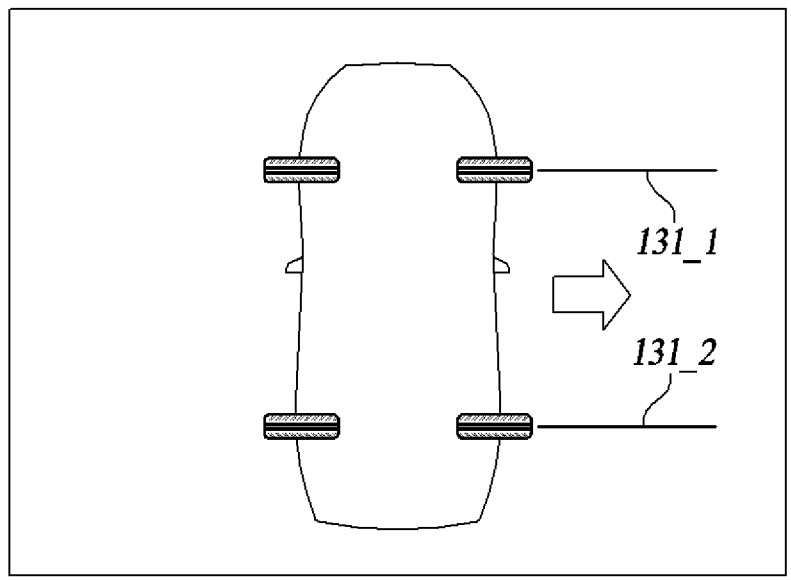

FIG. 3 is a guideline in a vertical driving mode according to an embodiment of the present disclosure.

Referring to FIGS. 2 and 3, the driving modes of the four-wheel steering vehicle include a normal driving mode, a vertical driving mode, an in-situ rotation mode, a diagonal driving mode, a reverse phase turn mode, and one-lane U-turn mode. According to an embodiment, driving modes may be classified according to steering angles of wheels.

A plurality of driving modes supported by the four-wheel steering vehicle may be maintained or changed according to an input of a driver. In the case of an autonomous driving system, artificial intelligence (AI) may maintain or change the driving mode of a vehicle based on its own determination. According to an embodiment of the present disclosure, a driver's way for changing a driving mode may be a button or voice. According to an embodiment, a button that may be touched or pressed by a driver may be located on or around a gear panel (not shown) for changing gears of a vehicle.

Referring to FIG. 3, when a top view of a surround view is output on the display 410, an arrow indicating a driving direction of a vehicle and the guideline 131 indicating a trajectory of the vehicle may be displayed together.

When a four-wheel steering vehicle is in a vertical driving mode, the steering angles of all wheels of the vehicle form 90 degrees. According to an embodiment of the present disclosure, when a driver presses a vertical driving mode button, the wheels of a vehicle are rotated so that the steering angle becomes 90 degrees. In this connection, the vehicle performs behavior in a direction perpendicular to the longitudinal direction of the vehicle. When parallel parking, the driver may utilize the vertical driving mode.

According to an embodiment, in the vertical driving mode, the first guideline 131_1 and a second guideline 131_2 may be displayed on the display 410. According to an embodiment, the first guideline 131_1 and the second guideline 131_2 may be straight lines extending in the same direction, and the first guideline 131_1 and the second guideline 131_2 may be display parallel to each other on the display 410.

According to an embodiment, an extension direction of the guideline 131 when a gear signal is forward (D, driving) and an extension direction of the guideline 131 when the gear signal is reverse (R) may be in opposite directions to each other. In other words, the extension direction of the guideline 131 is determined to correspond to the riding direction of a vehicle. For example, when the gear signal is forward (D), the guideline 131 may be formed toward the left side of the vehicle, and when the gear signal is reverse (R), the guideline 131 may be formed toward the right side of the vehicle.

According to an embodiment, the first guideline 131_1 is a straight line extending from the front wheel image, and the second guideline 131_2 is a straight line extending from the rear wheel image.

According to an embodiment, the first guideline 131_1 is a straight line extending from the most protruding point of a front portion of a vehicle image. The second guideline 131_2 is a straight line extending from the most rearward protruding point of a rear portion of the vehicle image. When the guideline 131 extends from the most protruding point in the vehicle image, a driver may intuitively understand whether parking is possible.

Figure 4:
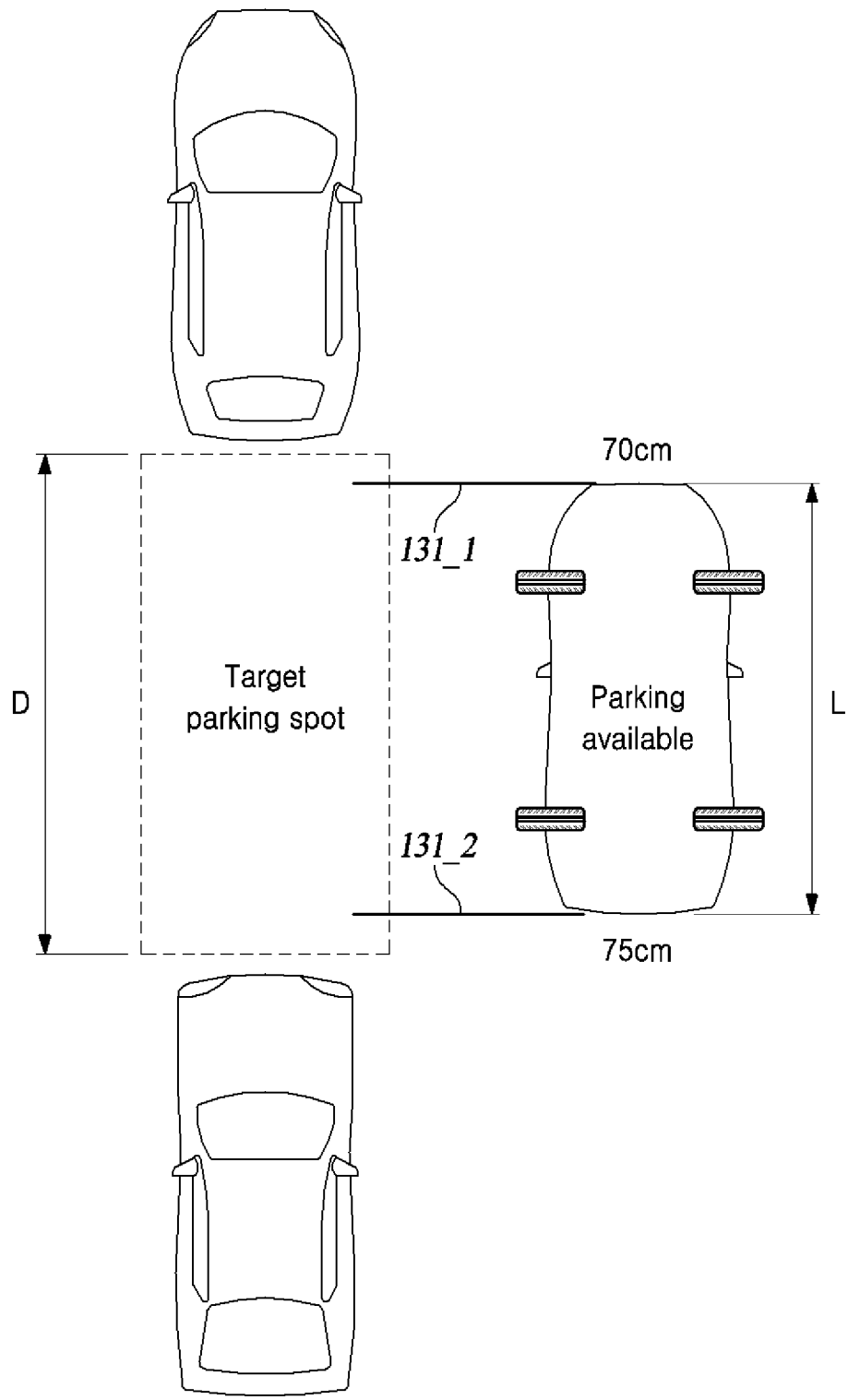
FIG. 4 is a guideline when parking is possible using a vertical driving mode according to an embodiment of the present disclosure.

FIG. 4 is a guideline when parking is possible using a vertical driving mode according to an embodiment of the present disclosure.

Figure 5:
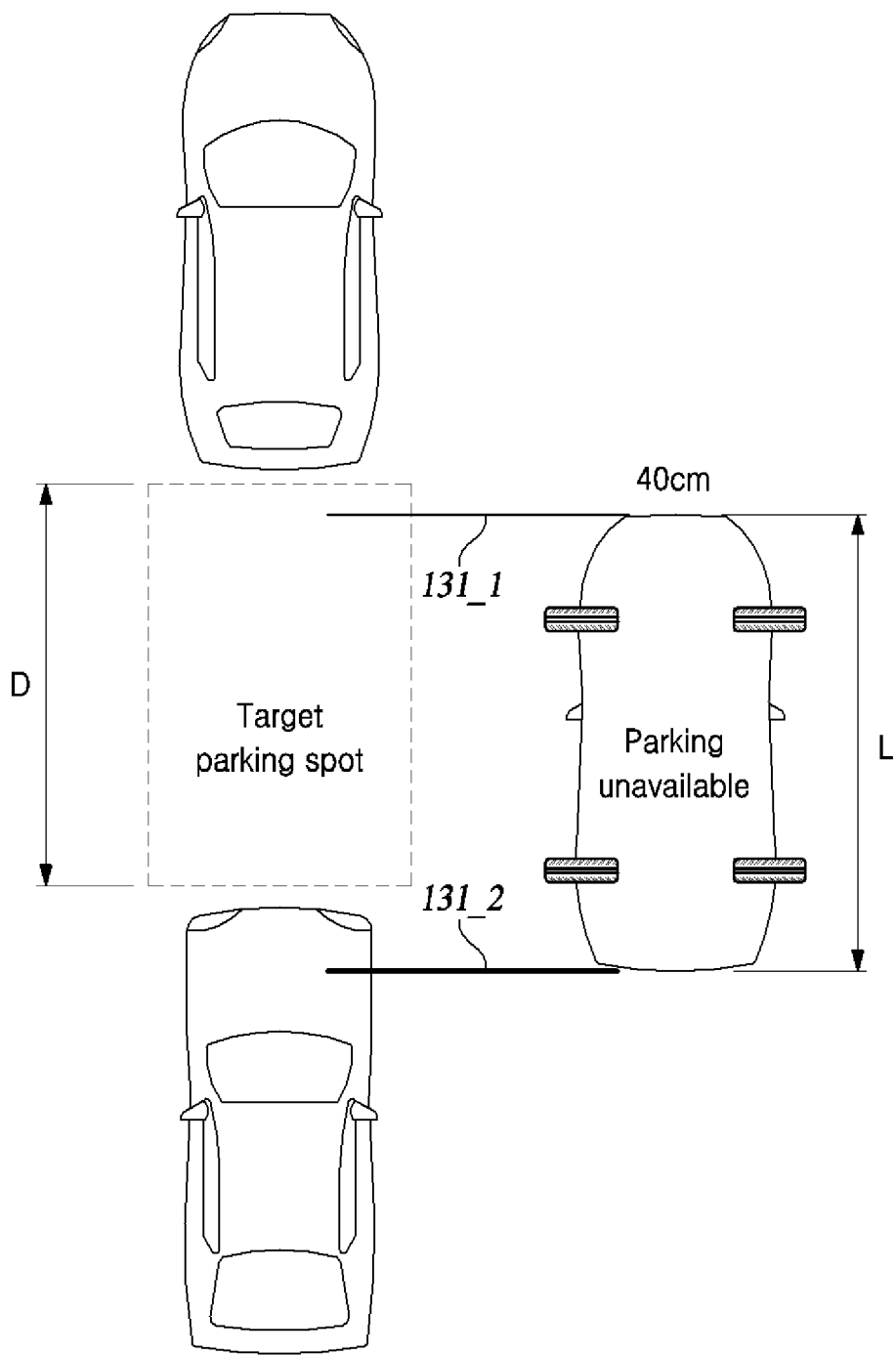
FIG. 5 is a guideline when parking is impossible using a vertical driving mode according to an embodiment of the present disclosure.

FIG. 5 is a guideline when parking is impossible using a vertical driving mode according to an embodiment of the present disclosure.

Referring to FIGS. 4 and 5, when parallel parking is performed using a vertical driving mode, the apparatus 1 for providing guidelines displays whether parking is possible on the display 410. Specifically, the distance calculation unit 140 calculates a distance D of parking space length D. The control unit 100 compares the distance D of parking space length D with the whole length L thereof, which is a length of a vehicle, and determines that parking is possible when the distance D of parking space length D is greater than the whole length L thereof and determines that parking is impossible when the distance D of parking space length D is smaller than the whole length L thereof. In the case of FIG. 4, it is determined that parking is possible because the distance D of parking space length D is greater than the whole length L thereof.

According to an embodiment, the distance calculation unit 140 may calculate a distance between a vehicle parked ahead of the target parking spot and a first guideline 131_1 during parallel parking, and may calculate a distance between a vehicle parked in the rear of the target parking spot and a second guideline 131_2. For example, a mark of 70 cm in FIG. 4 indicates a distance between a vehicle parked ahead of a target parking spot and the first guideline 131_1. The 75 cm mark in FIG. 4 indicates a distance between the vehicle parked behind the target parking spot and the second guideline 131_2.

Referring to FIG. 5, the distance between the vehicle parked ahead of the target parking spot and the first guideline 131_1 is indicated as being 40 cm, whereas the distance between the vehicle parked behind the target parking spot and the second guideline 131_2 is insufficient, and thus is not display. When parallel parking is attempted, the vehicle parked behind the target parking spot and the vehicle of a driver collide. As such, the apparatus 1 for providing guidelines may determine that parking is impossible when the distance D of parking space length D is smaller than the whole length L thereof, and display that parking is impossible. In addition, since the second guideline 131_2 overlaps a vehicle parked behind the target parking spot, the second guideline 131_2 may be displayed to be distinguished from the first guideline 131_1. In this connection, the driver may quickly recognize that parking is impossible with reference to the second guideline 131_2. The parking availability display and the parking unavailability display of FIGS. 4 and 5 are merely examples. A method of notifying whether parking is possible using voice is also possible, and another method may be used to notify whether parking is possible. Similarly, a method of displaying the second guideline 131_2 to be distinguished from the first guideline 131_1 is not limited to FIG. 5, either. The second guideline 131_2 may be displayed so as to flicker, or the color of the second guideline 131_2 and the color of the first guideline 131_1 may be used differently to distinguish the two guidelines. The determination of parking availability determination and notification of parking availability of the apparatus 1 for providing guidelines are not limited to parallel parking. For example, the determination of parking availability determination and notification of parking availability may also be applied even when parking is attempted using the diagonal driving mode.

Figure 6:
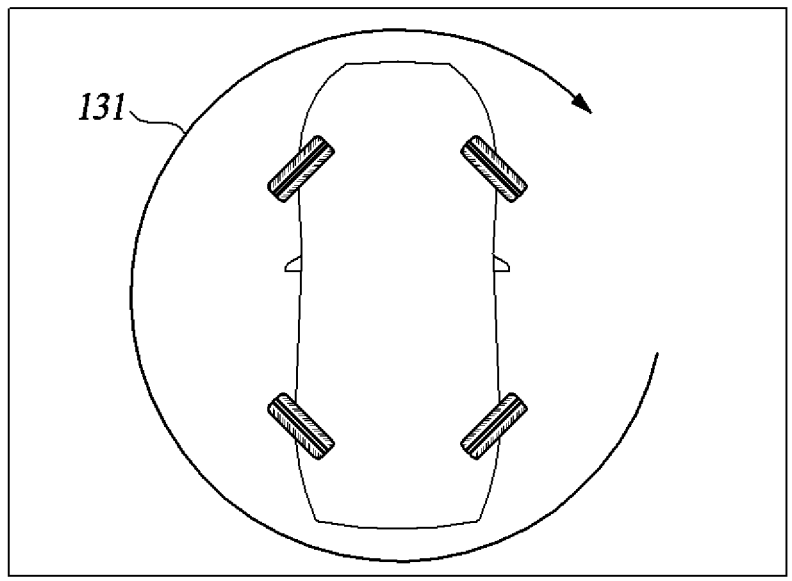
FIG. 6 is a guideline in an in-situ rotation mode according to an embodiment of the present disclosure.
Figure 6:
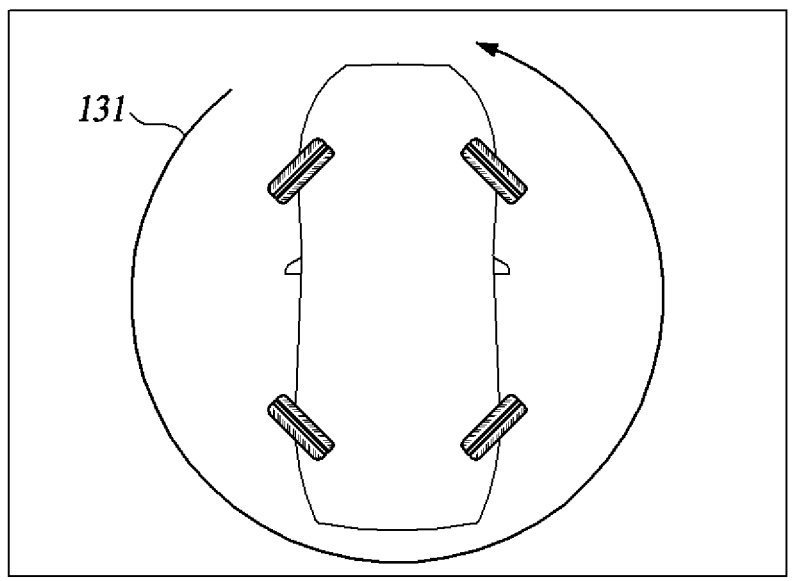

FIG. 6 is a guideline in an in-situ rotation mode according to an embodiment of the present disclosure.

Figure 7:
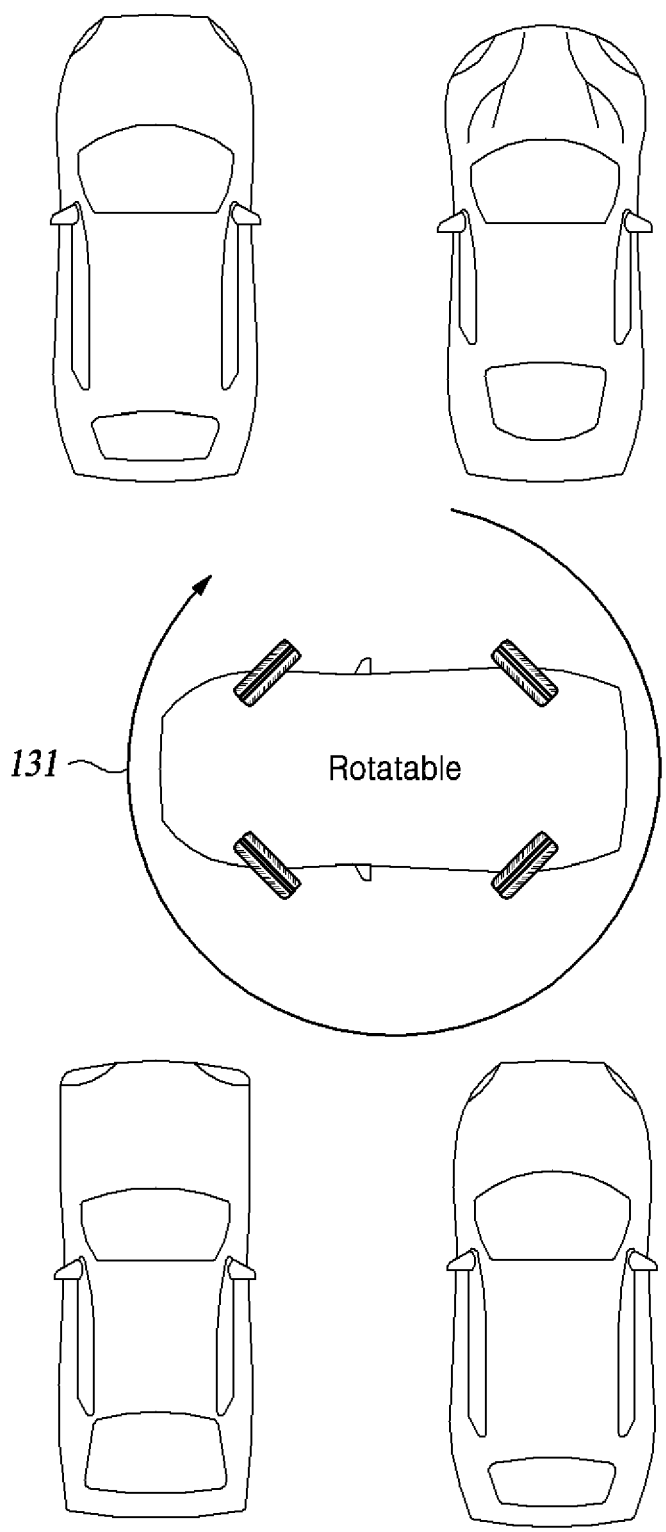
FIG. 7 is a guideline when in-situ rotation is possible according to an embodiment of the present disclosure.

FIG. 7 is a guideline when in-situ rotation is possible according to an embodiment of the present disclosure.

Figure 8:
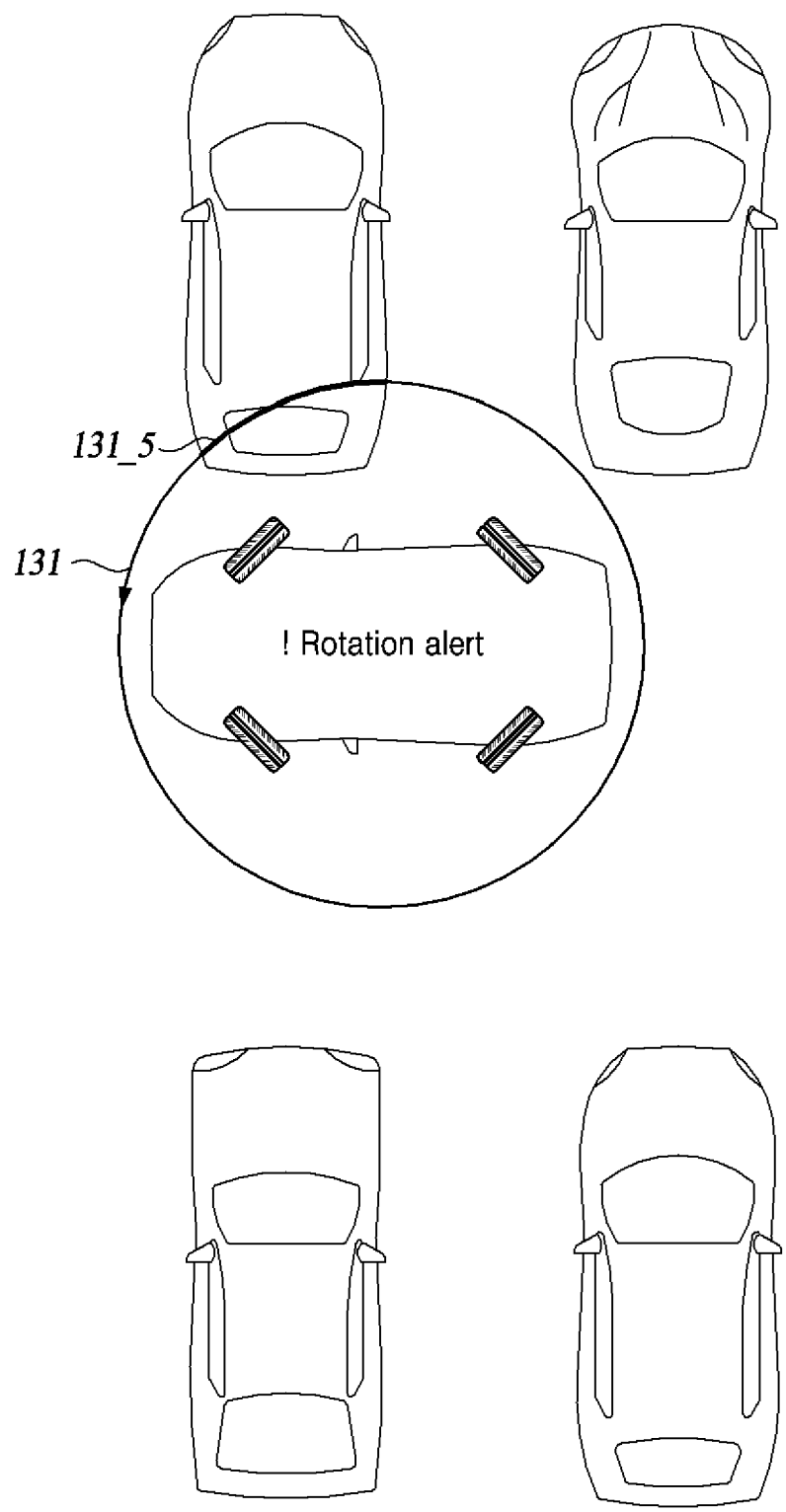
FIG. 8 is a guideline when in-situ rotation is impossible according to an embodiment of the present disclosure.

FIG. 8 is a guideline when in-situ rotation is impossible according to an embodiment of the present disclosure.

Referring to FIGS. 6 to 8, the in-situ rotation mode refers to a driving mode in which a vehicle rotates in situ without moving back and forth and left and right. In the case of the in-situ rotation mode, the center of rotation and the radius of rotation of the vehicle vary according to the specifications of the vehicle.

According to an embodiment of the present disclosure, in the case of the in-situ rotation mode, the guideline 131 may be a circle. According to an embodiment, in the case of the in-situ rotation mode, the guideline 131 may be an arc indicating a rotation direction of a vehicle.

According to an embodiment, when an object is located on the guideline 131, the control unit 100 may display the guideline 131 to distinguish a portion 131_5 with which the object overlaps 131_5 from a portion with which the object does not overlap among portions of the guideline 131. For example, as shown in FIG. 8, when a vehicle parked within the radius of the guideline 131 is located, a portion 131_5 of the guideline 131 may be displayed to be distinguished from a remaining portion thereof. It is also possible to display the overlapping portion 131_5 so as to flicker, it is possible to display the overlapping portion 131_5 to have a different color from the non-overlapping portion, and it is also possible to display a rotation alert with an exclamation mark as shown in FIG. 8. Voice guidance using sound is also possible. Various ways and methods may be used to allow a driver to recognize whether rotation is possible and whether rotation is alerted, and is not limited to the expression of FIG. 8.

Figure 9:
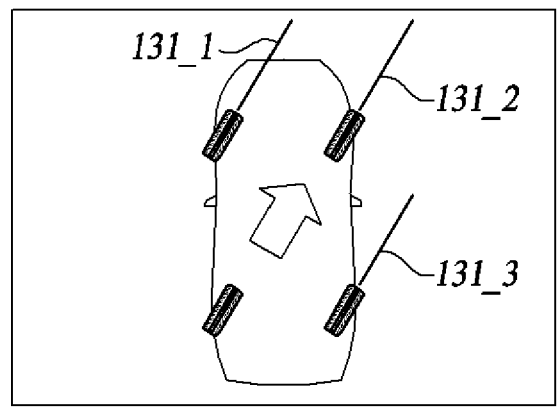
FIG. 9 is a guideline in a diagonal driving mode according to an embodiment of the present disclosure.
Figure 9:
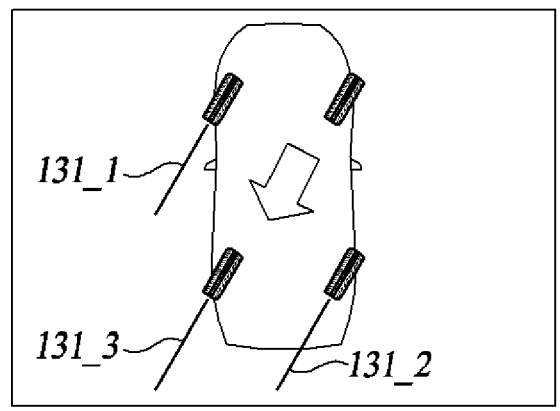
Figure 9:
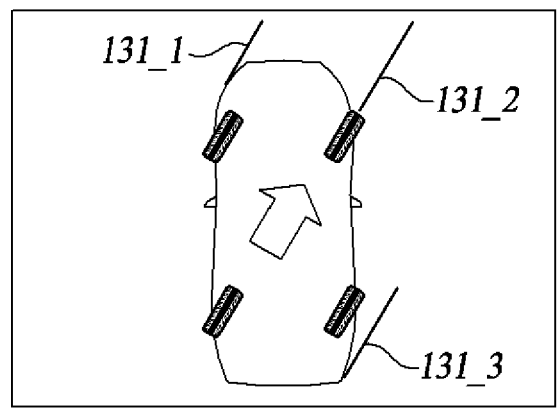

FIG. 9 is a guideline in a diagonal driving mode according to an embodiment of the present disclosure.

Referring to FIG. 9, when the driving mode is a diagonal driving mode, the guideline 131 may include the first guideline 131_1, the second guideline 131_2, and a third guideline 131_3. The guideline 131 may be displayed based on a steering angle. The guideline 131 may change in real time according to a change in steering angle. Diagonal driving is in-phase steering in which the steering direction of the front and rear wheels is the same. In the diagonal driving mode, the steering angle of the wheel may be changed based on the steering wheel manipulation of a driver. The diagonal driving mode may be utilized when changing lanes or adjusting the position of a vehicle in a diagonal direction when the vehicle is parked.

According to an embodiment of the present disclosure, the first guideline 131_1, the second guideline 131_2, and the third guideline 131_3 may be straight lines parallel to one another. According to an embodiment, the first guideline 131_1, the second guideline 131_2, and the third guideline 131_3 may be straight lines extending from the image of the wheels which each of the guidelines is respectively associated with.

According to an embodiment, the first guideline 131_1 and the third guideline 131_3 may be tangent lines tangent to different points of the vehicle on the display. When the first guideline 131_1 and the third guideline 131_3 are tangent lines, a driver may intuitively predict the trajectory of the most protruding portion of the vehicle and may easily predict whether a collision with an object located around the vehicle will occur.

According to an embodiment, the direction of extension of the guideline 131 when the gear signal is forward (D) and the direction of extension of the guideline 131 when the gear signal is reverse (R) are opposite to each other.

Figure 10:
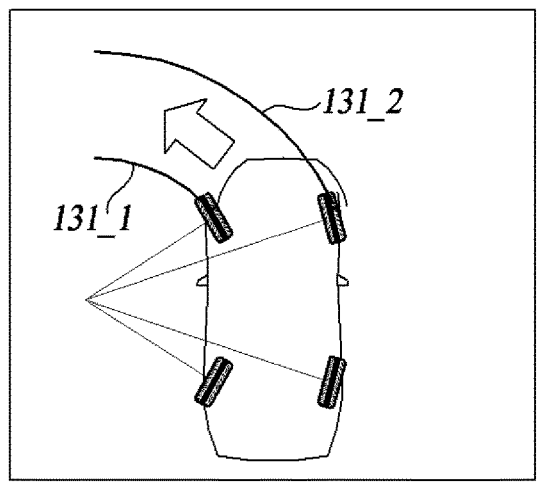
FIG. 10 is a guideline in a reverse phase turn mode according to an embodiment of the present disclosure.
Figure 10:
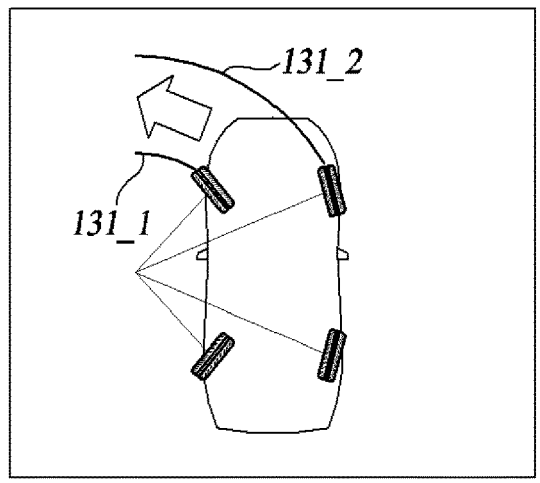
Figure 10:
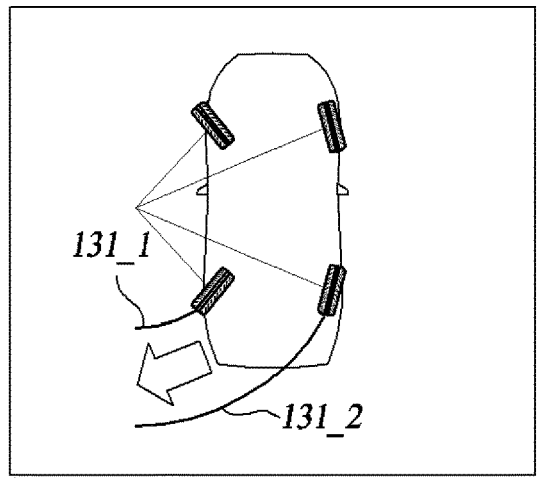

FIG. 10 is a guideline in a reverse phase turn mode according to an embodiment of the present disclosure.

Referring to FIG. 10, in a reverse phase turn mode, steering directions of front and rear wheels are in different reverse phases. The reverse phase turn mode may be usefully utilized when a vehicle performs turn behavior such as a one-lane U-turn, left turn, and right turn. Unlike a two-wheel steering vehicle, a four-wheel steering vehicle may control the steering angle of the rear wheels, so that the trajectory of the turn behavior may be more precisely controlled. In the case of performing low-speed reverse phase turn, the rotation centers of all wheels of the vehicle may all be in the same position. According to an embodiment, when the vehicle performs turn behavior using the reverse phase turn mode, the first guideline 131_1 and the second guideline 131_2 may be displayed to extend from the image of the wheel.

According to an embodiment, the first guideline 131_1 and the second guideline 131_2 may each be a curve tangent to different points of the vehicle on the display. When the first guideline 131_1 and the second guideline 131_2 are curves tangent to a point of the vehicle, a driver may intuitively predict the trajectory of the most protruding portion of the vehicle and may easily predict whether a collision with an object located around the vehicle will occur.

According to an embodiment, the direction of extension of the guideline 131 when the gear signal is forward (D) and the direction of extension of the guideline 131 when the gear signal is reverse (R) are opposite to each other.

Figure 11:
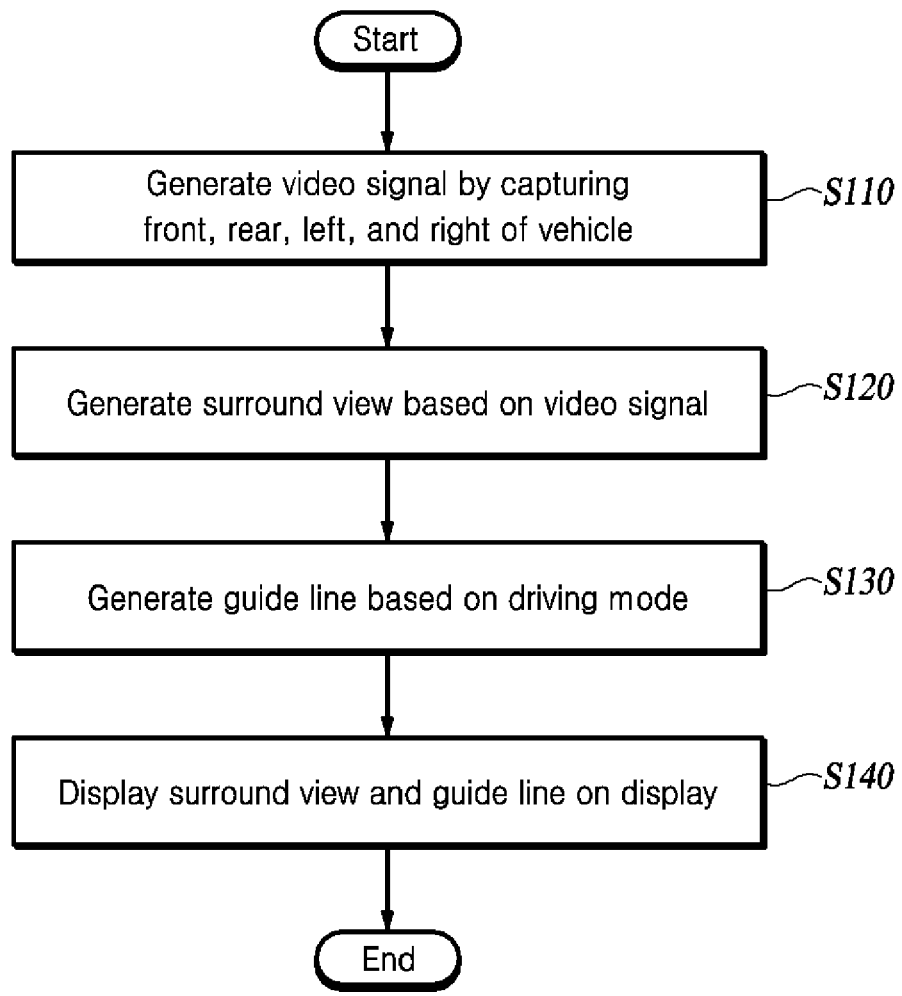
FIG. 11 is a flowchart of a method for providing guidelines according to an embodiment of the present disclosure.

FIG. 11 is a flowchart of a method for providing guidelines according to an embodiment of the present disclosure.

Referring to FIG. 11, the apparatus 1 for providing guidelines may generate a video signal by capturing the front, rear, left, and right of a vehicle using the plurality of cameras 310 (S110). However, it is not necessary to generate a video signal using the camera 310. Any device or way capable of generating a video signal by detecting an object around the vehicle may be used. The apparatus 1 for providing guidelines may generate a surround view based on the video signal (S120). When steering a vehicle, a driver may use the top view to clearly grasp the arrangement of the vehicle he or she is driving and the vehicles of others.

The apparatus 1 for providing guidelines generates the guideline 131 based on driving mode (S130), and displays the generated surround view and the guideline 131 on a display (S140). For example, when the driving mode of the apparatus 1 for providing guidelines is a vertical driving mode, the first guideline 131_1 and the second guideline 131_2 may be generated, and the first guideline 131_1 and the second guideline 131_2 may be tangent lines tangent to the most protruding portion from the image of a vehicle. When the driving mode is an in-situ rotation mode, the guideline 131 may be a circle. The apparatus 1 for providing guidelines may detect whether there is an object around the vehicle and display whether the vehicle may rotate in situ without colliding with the surrounding objects.

Figure 12:
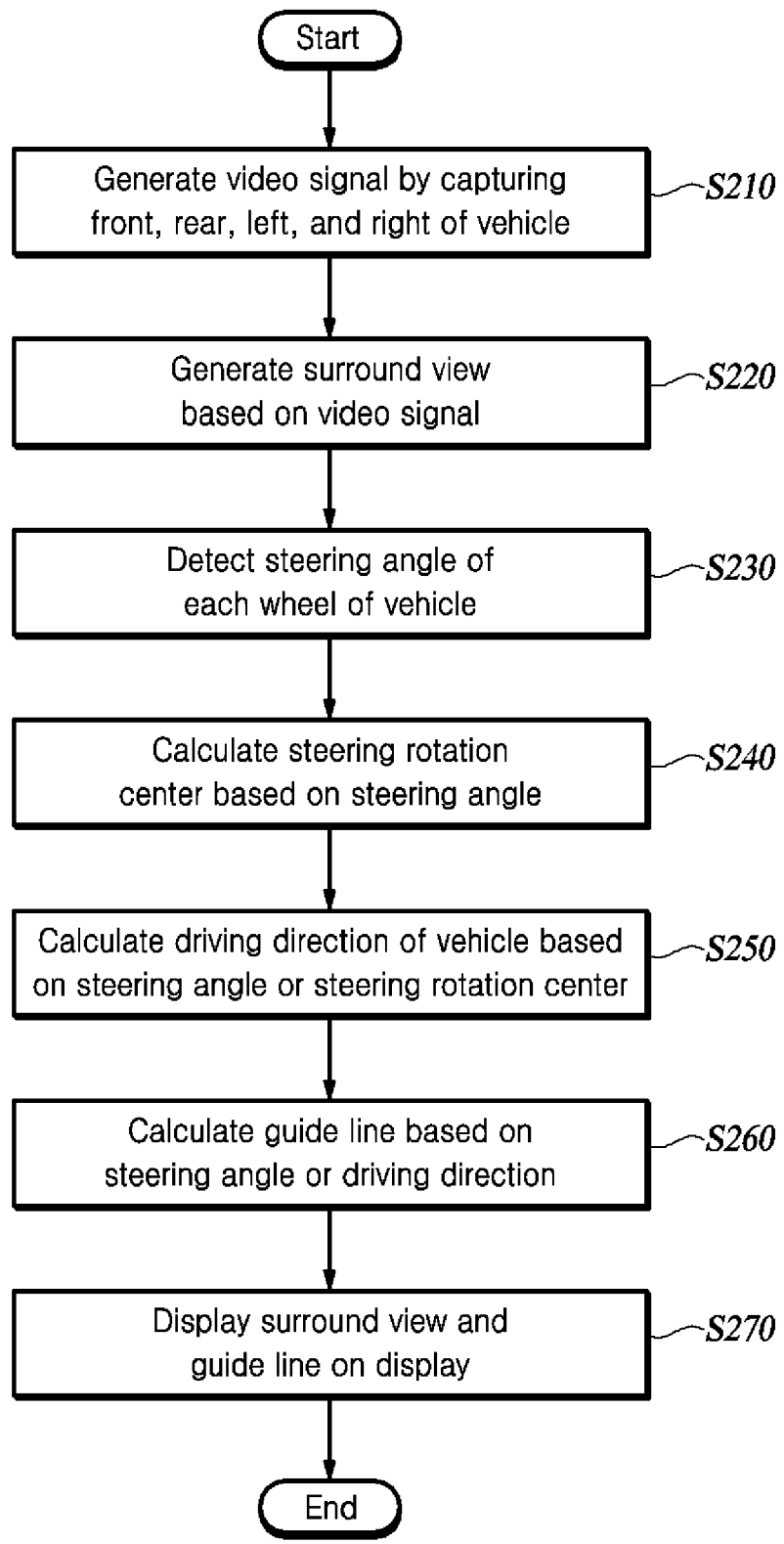
FIG. 12 is a flowchart of a method for providing guidelines according to another embodiment of the present disclosure.

FIG. 12 is a flowchart of a method for providing guidelines according to another embodiment of the present disclosure.

Referring to FIG. 12, the apparatus 1 for providing guidelines may generate a video signal by capturing the front, rear, left, and right of a vehicle using the plurality of cameras 310 (S210), and the apparatus 1 for providing guidelines may generate a surround view based on the generated video signal (S220). The apparatus 1 for providing guidelines detects the steering angle of each wheel of a vehicle (S230). The steering angle sensor 210 may be used to detect the steering angle of each wheel. When the steering angle is detected, the apparatus 1 for providing guidelines calculates the steering rotation center of the turn behavior based on the detected steering angle (S240). The apparatus 1 for providing guidelines calculates the driving direction of the vehicle based on the steering rotation center and steering angle information (S250). When a four-wheel steering vehicle performs low-speed driving, all four wheels may have the same steering rotation center. The apparatus 1 for providing guidelines generates the guideline 131 based on the steering angle or the calculated driving direction of the vehicle (S260), and displays the generated surround view and guideline 131 on the display 410 (S270). When the steering angle changes every moment due to the steering wheel manipulation of a driver, the apparatus 1 for providing guidelines controls the guideline 131 in real time based on the driving direction or steering angle of the vehicle.

Although it is described that each process is sequentially executed in the flowchart of the present specification, this is merely illustrative of the technical idea of an embodiment of the present disclosure. In other words, one of ordinary skill in the art to which an embodiment of the present disclosure pertains will be able to change and execute the order described in the flowchart without departing from the essential characteristics of an embodiment of the present disclosure, and apply various modifications and variations to executing one or more of each process in parallel. Accordingly, the flowchart is not limited to a time-series order.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand that the scope of the claimed invention is not to be limited by the above explicitly described embodiments but by the claims and equivalents thereof.

What is claimed is:

1. A method for providing guidelines for parking and stopping of a four-wheel steering vehicle, the method comprising:
   generating a surround view based on a video signal acquired from a plurality of cameras that capture front, rear, left, and right sides of the vehicle;
   determining a driving mode of the vehicle;
   generating the guidelines based on the driving mode of the vehicle; and
   displaying the surround view and the guidelines on a display unit,
   wherein:
      the driving mode is classified according to a steering angle of each wheel of the vehicle;
      the guidelines are displayed to extend from an image of the vehicle on the display unit;
      the guidelines comprise a first vertical guideline and a second vertical guideline when the driving mode is determined to be a vertical driving mode; and
      in parallel parking of the vehicle, when an interval between a first another vehicle parked ahead of a target parking spot and a second another vehicle parked behind the target parking spot is defined as a parking space length, the parking space length and a whole length of the vehicle are compared to display on the display unit whether parking is available for the vehicle according to a comparison result of the parking space length and the whole length of the vehicle.

2. The method of claim 1, wherein:
   the vertical driving mode is a driving mode in which steering angles of all wheels of the vehicle are 90 degrees;
   the first vertical guideline is a straight line extending from a most forward protruding point of a front portion of the image of the vehicle; and
   the second vertical guideline is a straight line extending from a most rearward protruding point of a rear portion of the image of the vehicle.

3. The method of claim 1, wherein the first vertical guideline and the second vertical guideline extend in a common direction, and an extension direction when a gear signal indicating a direction of the vehicle is forward and an extension direction when the gear signal indicating the direction of the vehicle is reverse are opposite to each other.

4. The method of claim 1, wherein, in parallel parking, a distance between a first another vehicle parked ahead of a target parking spot and the first vertical guideline is displayed on the display unit, and a distance between a second another vehicle parked behind the target parking spot and the second vertical guideline is displayed on the display unit.

5. The method of claim 1, wherein:
   the guidelines comprise rotational guidelines which are displayed on the display unit as a circle when the driving mode is determined to be an in-situ rotation mode;
   the in-situ rotation mode is a driving mode in which the vehicle rotates in situ; and
   when an object is located on the rotational guidelines in the display unit, the rotational guidelines are displayed to distinguish a portion with which the object overlaps from a portion with which the object does not overlap among portions of the rotational guidelines.

6. The method of claim 1, wherein:
the guidelines comprise a first diagonal guideline, a second diagonal guideline, and a third diagonal guideline displayed on the display unit based on the steering angle of each wheel of the vehicle when the driving mode is a diagonal driving mode;
the diagonal driving mode is a driving mode in which steering angles of all wheels of the vehicle have a common value; and
the first diagonal guideline, the second diagonal guideline, and the third diagonal guideline are respectively extended in parallel based on steering angles of corresponding wheels and are straight lines parallel to one another.

7. The method of claim 6, wherein the first diagonal guideline and the third diagonal guideline are lines tangent to different points of the image of the vehicle on the display unit.

8. An apparatus for providing guidelines for parking and stopping of a four-wheel steering vehicle, the apparatus comprising:
a detection unit configured to detect a steering angle of each wheel of the vehicle;
an imaging unit configured to capture front, rear, left, and right sides of the vehicle and to provide images of the front, rear, left side, and right side of the vehicle;
a control unit configured to generate a surround view by combining the front, rear, left, and right images of the vehicle, to determine a driving mode of the vehicle, and to control the guidelines relative to the surround view; and
a display unit configured to display the surround view and the guidelines,
wherein the control unit comprises:
a surround view generation unit configured to generate the surround view based on a video signal input from the imaging unit;
a driving direction calculation unit configured to calculate a steering rotation center based on the steering angle of each of the wheels and calculating a driving direction of the vehicle based on at least one of the steering angle and the steering rotation center; and
a guideline generation unit for generating the guidelines based on at least one of the steering angle of each of the wheels and the driving direction of the vehicle,
wherein the guidelines are displayed on the display unit to extend from an image of the vehicle;
wherein the guidelines comprise a first vertical guideline and a second vertical guideline when the driving mode is determined to be a vertical driving mode; and
in parallel parking of the vehicle, when an interval between a first another vehicle parked ahead of a target parking spot and a second another vehicle parked behind the target parking spot is defined as a parking space length, the parking space length and a whole length of the vehicle are compared to display on the display unit whether parking is available for the vehicle according to a comparison result of the parking space length and the whole length of the vehicle.

* * * * *